United States Patent
Ramanujam et al.

(10) Patent No.: US 10,839,050 B2
(45) Date of Patent: Nov. 17, 2020

(54) ACTIVATION OF AN APPLICATION BASED ON PRIOR ACTIVATION OF AN ISOLATED COUNTERPART APPLICATION

(71) Applicant: Microsoft Technology Licensing, LLC, Redmond, WA (US)

(72) Inventors: Sinduja Ramanujam, Redmond, WA (US); Axel Alejandro Gutierrez Olivo, Redmond, WA (US); Carlos E. Peza Ramirez, Redmond, WA (US); Amit Jain, Sammamish, WA (US); Andrei Scripniciuc, Seattle, WA (US); Vlad Riscutia, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 344 days.

(21) Appl. No.: 15/916,146

(22) Filed: Mar. 8, 2018

(65) Prior Publication Data
US 2019/0278887 A1     Sep. 12, 2019

(51) Int. Cl.
*G06F 21/00* (2013.01)
*G06F 21/10* (2013.01)
(Continued)

(52) U.S. Cl.
CPC ........ *G06F 21/105* (2013.01); *G06F 9/44505* (2013.01); *G06F 9/455* (2013.01); *G06F 2221/0704* (2013.01); *H04L 2463/103* (2013.01)

(58) Field of Classification Search
None
See application file for complete search history.

(56) References Cited

U.S. PATENT DOCUMENTS

| | | | |
|---|---|---|---|
| 8,763,159 B1* | 6/2014 | Kobets | G06F 21/105 726/31 |
| 8,839,246 B2* | 9/2014 | Fitzgerald | G06F 9/455 718/1 |

(Continued)

OTHER PUBLICATIONS

Kovatsch, Matthias et al. Actinium: A RESTful runtime container for scriptable Internet of Things applications. 2012 3rd IEEE International Conference on the Internet of Things. https://ieeexplore.ieee.org/stamp/stamp.jsp?tp=&arnumber=6402315 (Year: 2012).*

(Continued)

*Primary Examiner* — Jeremiah L Avery
(74) *Attorney, Agent, or Firm* — Newport IP, LLC; Mike R. Cicero

(57) ABSTRACT

A system activates an application on a computing device based on a prior activation of an isolated counterpart application on the computing device. An application that is restricted from sharing a license with a counterpart application locally on the computing device is enabled to instead communicate with an application license manager to manage license data corresponding to the counterpart application. For example, when a license is obtained at the computing device for a container application, the application license manager may update license data in association with a native application so that a counterpart license can be obtained automatically by the native application, and vice versa. Thus, once a user has responded to an activation prompt for either one of the container application or the native application, whichever application the user has not manually activated will be automatically activated at the computing device based on communications with the application license manager.

20 Claims, 7 Drawing Sheets

(51) Int. Cl.
 *G06F 9/445* (2018.01)
 *G06F 9/455* (2018.01)

(56) References Cited

U.S. PATENT DOCUMENTS

| | | | |
|---|---|---|---|
| 2005/0132347 A1 | 6/2005 | Harper et al. | |
| 2007/0083610 A1* | 4/2007 | Treder | H04L 67/34 709/217 |
| 2007/0100701 A1* | 5/2007 | Boccon-Gibod | H04L 63/0492 705/21 |
| 2011/0173251 A1* | 7/2011 | Sandhu | G06F 21/53 709/203 |
| 2012/0036220 A1* | 2/2012 | Dare | H04L 67/04 709/217 |
| 2014/0006347 A1* | 1/2014 | Qureshi | G06F 21/53 707/621 |
| 2016/0132214 A1* | 5/2016 | Koushik | G06F 9/455 715/741 |
| 2018/0032997 A1* | 2/2018 | Gordon | G06Q 30/0269 |

OTHER PUBLICATIONS

Sheoran, Amit et al. An empirical case for container-driven fine-grained VNF resource flexing. 2016 IEEE Conference on Network Function Virtualization and Software Defined Networks (NFV-SDN). https://ieeexplore.ieee.org/stamp/stamp.jsp?tp=&arnumber=7919486 (Year: 2016).*
"International Search Report and Written Opinion Issued in PCT Application No. PCT/US19/020174", dated Jun. 7, 2019, 11 Pages.

* cited by examiner

ACTIVATION OF AN APPLICATION BASED ON PRIOR ACTIVATION OF AN ISOLATED COUNTERPART APPLICATION

BACKGROUND

Some computing systems are designed to run an application in a manner so as to isolate the application from one or more counterpart applications. For example, the application may be designed to run within a container that is initiated by an operating system (OS) when a user instructs the OS to launch the application. Although a container may be a useful tool to ensure that the application operates reliably on any given computing platform, the container can present challenges in relation to permitting the application to securely communicate with other applications that are running outside of the container. In particular, the OS will typically impose numerous limitations on how an application that is running within a particular container is permitted to communicate with other applications that are designed to run external to the particular container.

Unfortunately, communication barriers that are imposed with respect to containers may prevent even some desirable communications from being securely transmitted between an application that is running within the container and a counterpart application(s) that is designed to run external to the container. For example, under many circumstances an application that is running within a container may be unable to directly communicate with, or even securely write information to, a storage location that is accessible by the counterpart application. Thus, the counterpart application(s) may remain unapprised as to when certain activities are performed with respect to an application while it is running within the container, even when those activities are directly germane to the governance of certain behaviors and/or functionalities of the counterpart application(s).

It is with respect to these and other considerations that the disclosure made herein is presented.

SUMMARY

Technologies described herein enable a system to securely activate an application on a computing device based on a prior activation of an isolated (e.g., containerized) counterpart application on the computing device. Embodiments disclosed herein enable an application that is restricted from directly communicating with a counterpart application (e.g., due to containerization) to share license data locally to communicate instead with an application license manager (that is external to the computing device) to manage license data corresponding to the counterpart application. For example, in a scenario where a container application and a native application are installed on a particular computing device, an operating system (OS) of the computing device may restrict communications to and from the container application so that a license that is obtained by the container application cannot be directly shared with the native application. According to the techniques described herein, when a license is obtained at the computing device for the container application, the application license manager is caused to update license data in association with the native application so that a counterpart license can be obtained automatically by the native application, and vice versa. In this way, once a user has positively responded to an activation prompt that is presented by either one of the container application or the native application, whichever application the user has not manually activated by providing user input will be automatically activated at the computing device based on communications with the application license manager.

The disclosed technologies represent a substantial advantage over existing application activation systems which can jointly activate counterpart applications only under circumstances where the counterpart applications can directly communicate with one another. For example, some modern application suites are configured to locally store a license to share licensing statuses between multiple applications. When a particular application is activated on a computing device, a license obtained during that activation is locally stored in a shared location (e.g., Registry Keys) to activate all of the counterpart applications of the application suite. However, under circumstances where a counterpart application is isolated (e.g., containerized) from the particular application through which the license was obtained, existing application activation systems lack functionality for securely sharing the license with the "isolated" counterpart application. The unfortunate result of this limitation is that redundant activation prompts may be exposed via counterpart application(s) even after a user has responded to a previous activation prompt. It can be appreciated that redundant computing processes (e.g., exposing redundant activation prompts) result in exorbitant consumption of computing resources. For example, by causing a user to progress through redundant activation sequences for counterpart products, the processing units of a computing device are caused to undergo unnecessarily high numbers of processing cycles. Additionally, due to the user having to re-enter much of the same information (e.g., credentials, user names, passwords, etc.) in a redundant activation prompt as was previously entered in an initial activation prompt, it can further be appreciated that redundant activation prompts also unnecessarily increase networking traffic.

In an exemplary implementation, a computing device has installed thereon a native application and a container application that an operating system (OS) of the computing device at least partially restricts communications between. In particular, when the container application is launched, the OS initiates the container application within a container that restricts communications between it and other applications that are designed to run natively on the computing device. Exemplary containers include, but are not limited to, LINUX containers, MICROSOFT HYPER-V containers, WINDOWS SERVER containers, and/or any other operating-system-level virtualization method. The native application may be configured to be run by an operating system (OS) without containerization layers that are associated with the container application. By virtue of the container, the container application may be restricted from passing information to the native application, and vice versa. For example, if either one of the native application or the container application have been activated on the computing device by storing a license locally thereon, the container may prevent that license from being shared locally for use by both the container application and the native application.

In this exemplary implementation, the native application is a counterpart to the container application in the sense that an activation of either one of these applications on the computing device is also applicable to the other application. For example, the container application and the native application may be commonly associated with an application suite for which a single license is usable by multiple applications. As a specific but non-limiting example, the container application may be an application management portal (e.g., MY OFFICE by MICROSOFT) for managing subscriptions for and/or viewing recent activity of a plurality of different native applications (e.g., MICROSOFT VISIO, MICROSOFT WORD, MICROSOFT POWERPOINT, etc.) that are installed and/or are available for installation on the computing device. However, due to the container restricting communications between the native application and the container application, it may not be feasible to locally pass a license that is received by the container application to the native application(s) for activation on the computing device.

For example, upon a user launching the container application, the container application determines that it is not currently activated on the computing device and responds by exposing an activation prompt. The activation prompt may, for example, be designed to inform the user that the container application is not currently activated and to prompt the user to enter user credentials and/or a product key to activate the container application. Based on user input received via the activation prompt, the container application transmits an activation request to an application license manager with which both the container application and the native application can communicate. In this example, the activation request includes a machine identifier (ID) that uniquely identifies the computing device. The activation request may further include an activation scope that indicates whether the activation request applies to the native application.

As a specific but non-limiting example, the computing device may have installed thereon the container application as well as a first native application through an $N^{th}$ native application. In this example, the activation request may define a subset of these applications as, for example, the first native application, a second native application, and the container application, to enable activation of this subset of applications on the computing device. Based on the machine ID and the activation scope that are provided in the activation request, the application license manager may update license data for the subset of applications in association with the machine ID. Thus, in this specific example, the application license manager will update the license data to designate all of the first application, the second native application, and the container application for activation on the computing device.

In some embodiments, the application license manager may provide, to the container application, product activation data that includes a container license for activation of the container application on the computing device. Then, the container application may store the container license in a "container available" portion of the local storage that is available to the container application but is not available to the native application(s). The container available portion of the local storage may be a virtual registry that is accessible only by the container application and/or other applications that are designed to run within the container. Accordingly, upon a user closing down and then re-launching the container application, the container license can be obtained by the container application (e.g., to unlock various functionalities of the container application). In contrast, when the native application is launched it will not be able to obtain the container license despite the container license being stored locally on the computing device.

Rather than exposing a redundant activation prompt to the user due to the local unavailability of a license, the native application may transmit an activation inquiry to the application license manager to determine whether it has been designated for activation on the computing device. For example, after having already deployed the container application to transmit the activation request, the user may instruct the OS to launch the native application. Then, the native application may determine that a native license is not locally available and, based thereon, transmit the activation inquiry to the application license manager. Responsive to the activation inquiry, the application license manager examines the license data and determines that the native application has been designated for activation on the computing device. Accordingly, the application license manager returns counterpart product activation data for activation of the native application on the computing device. The counterpart product activation data may include a native license for the native application to store in a "native available" portion of the local storage that is available to the native application(s) but is not available to the container application.

Thus, once the counterpart product activation data is received by the native application, both of the container application and the native application(s) may be activated on the computing device based on the single activation request that is sent via the container application despite the communication barriers presented by the container. In this way, a user can seamlessly cause activation of both container application(s) and native application(s) by positively responding to a single activation prompt. It can be appreciated that the techniques disclosed herein provide benefits over existing application activation techniques which would require the user to respond to separate activation prompts in association with each of the container application and at least one native application since the container prevents these applications from securely sharing license information locally on the computing device.

It should be appreciated that any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual applications and/or activation inquiries and/or licenses may be distinguished by numerical designations without such designations corresponding to the claims or even other paragraphs of the Summary and/or Detailed Description. For example, any designation of a "first activation inquiry" and "second activation inquiry" within a paragraph of this disclosure is used solely to distinguish two different activation inquiries within that specific paragraph—not any other paragraph and particularly not the claims.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical to refer to each individual item. Generic references to the items may use the specific reference number without the sequence of letters.

DETAILED DESCRIPTION

Figure 1:
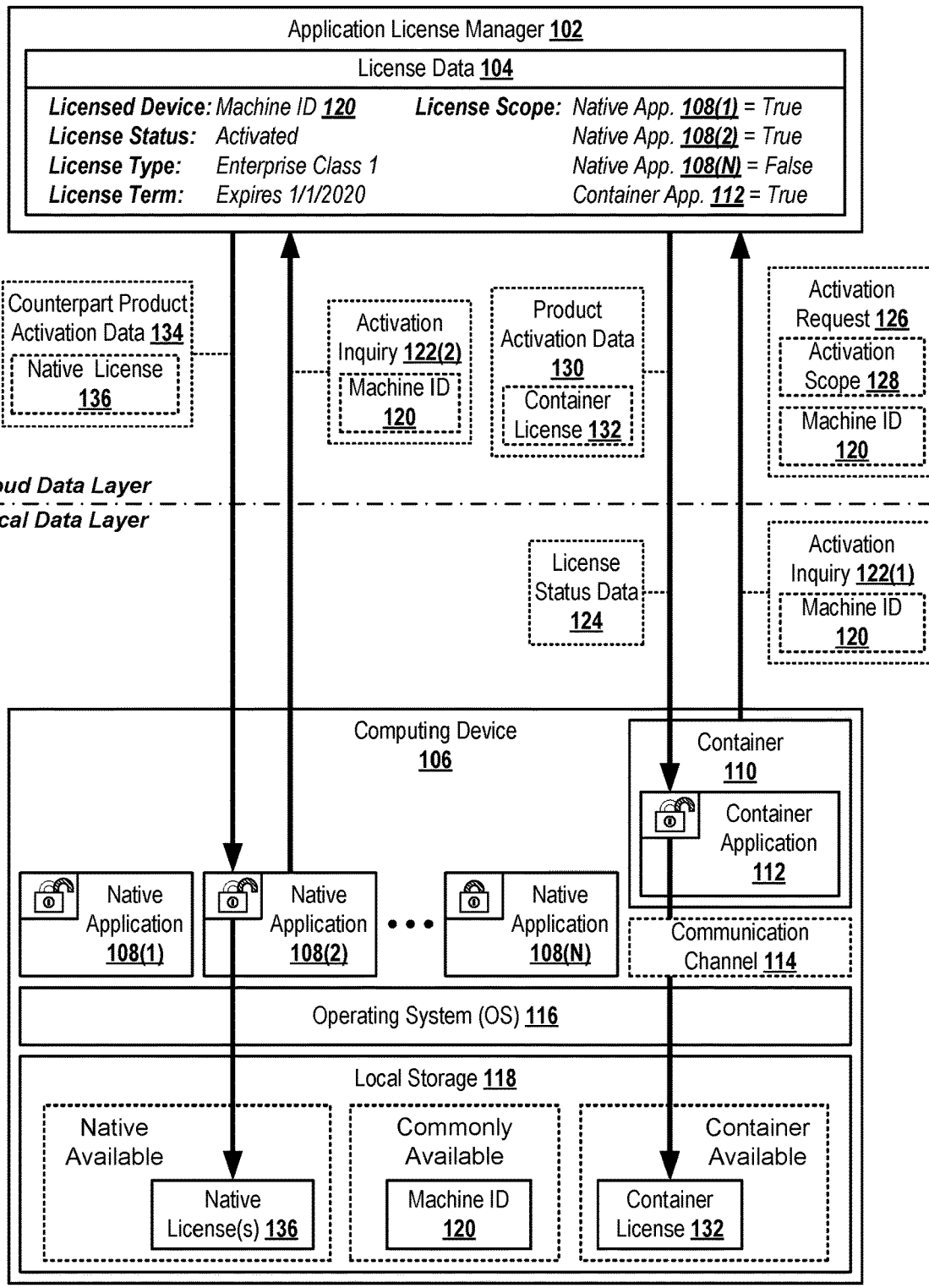
FIG. 1 illustrates an exemplary system for activating an application on a computing device based on a prior activation of an at least partially isolated counterpart application on the computing device.

The following Detailed Description describes technologies that enable a system to securely activate one or more applications on a computing device based on a prior activation of an isolated (e.g., containerized) counterpart application on the computing device. An exemplary embodiment of the system described herein enables a user to provide user input in association with an activation prompt of a container application that is installed on a computing device. Aspects of the user input are used by the container application to generate an activation request that is sent from the computing device to an application license manager. The activation request may include a machine identifier (ID) that uniquely identifies the computing device. The activation request may also include an activation scope which indicates which application(s) on the computing device the activation request applies to. For example, the activation scope might indicate that the activation request is applicable to both the container application as well as a native application that is a counterpart to the container application. Responsive to the activation request, the application license manager may return, to the container application, product activation data that includes a license that is usable for activating the container application on the computing device. Upon receipt of the license, the container application may store the license locally so that each time a user closes and re-launches the container application the license can be read to determine the activation status of the container application.

Subsequent to having activated the container application, the user may launch the native application that the activation request which was previously sent by the container application is also applicable to. For example, the container application and the native application may be "counterparts" in the sense that an activation of either one is also applicable to the other. However, by virtue of the container application being designed to run within a container, an operating system (OS) of the computing device may impose restrictions on communications between the container application and the native application. Thus, even though the container application may have already received the license at the computing device, it may be impractical for this license to be locally shared between the container application and the native application.

Notwithstanding the native application being unable to locally communicate with the container application so as to obtain the license, the native application may refrain from exposing an activation prompt to the user. Rather, the native application may transmit to the application license manager an activation inquiry that includes the machine ID to cause the application license manager to determine whether the native application has been designated for activation on the computing device. For example, upon receipt of the activation request from the container application, the application licensing manager may update license data to indicate which application(s) on the computing device are to be automatically activated upon request. Because in the current example the activation scope indicated that the activation request was also applicable to the native application, the application license manager responds to the activation inquiry received from the native application with a license that is usable to activate the native application on the computing device. In this way, once a user has positively responded to an activation prompt that is presented by the container application, the native application (which the user has not manually activated by providing user input) will be automatically activated at the computing device based on communications with the application license manager.

The present disclosure is believed to be applicable to a variety of systems and approaches involving jointly licensing and/or activating two or more applications which are at least partially isolated from one another on a computing device. Aspects of the present disclosure are predominantly described in the context of an exemplary implementation in which an activation request is sent by a container application and wherein the activation request defines an activation scope that covers a native application that is installed on the same computing device as the container application. While the present disclosure is not necessarily limited to this exemplary implementation, an appreciation of various aspects of the disclosed techniques is best gained through a discussion of such an exemplary implementation. It can be appreciated that the disclosed techniques are also applicable to other implementations in which a native application sends an activation request defining an activation scope as including a container application. For example, a user manually activating a native application may result in an automatic activation of a container application, and vice versa.

Turning now to FIG. 1, illustrated is an exemplary system 100 for activating an application on a computing device 106 based on a prior activation of an at least partially isolated counterpart application on the computing device 106. More specifically, in the illustrated example, one or more of native applications 108 are automatically activated on the computing device 106 based on an activation request 126 that is generated by a container application 112 with which the one or more native applications 108 are at least partially restricted from communicating.

In the illustrated example, the computing device 106 is shown to include a first native application 108(1) through an N$^{th}$ native application 108(N). As used herein, the term "native application" may refer generally to any computing application that is configured to run by accessing one or more native features of an operating system (OS) 116 of the computing device 106. Exemplary native applications include, but are not limited to, WIN32 applications that are capable of accessing a full set of WINDOWS application programing interfaces (APIs). It can be appreciated, therefore, that under various exemplary circumstances desktop versions of MICROSOFT VISIO, MICROSOFT WORD, MICROSOFT POWERPOINT, ADOBE ACROBAT, and/or ABOBE PHOTOSHOP may aptly be described as native applications.

As further illustrated, the computing device 106 includes a container application 112 that is designed to be run by the OS 116 in a container 110. As used herein, the term "container application" may refer generally to any computing application that is configured to be run within an isolated (e.g., contained) computing environment such as, for example, a LINUX container, a MICROSOFT HYPER-V container, a WINDOWS SERVER container, and/or any other isolated computing environment that is facilitated via operating-system-level virtualization methods. The computing device 106 may further include a communication channel 114 that enables at least some communications between the OS 116 and the container application 112. In some embodiments, the communication channel 114 may be a virtual socket channel such as, for example, a HYPERVISOR socket channel.

In the illustrated example, the computing device 106 further includes a local storage 118. Exemplary local storage 118 may include, but is not limited to, SATA-type solid-state hard drives, SATA-type hard disks, PATA-type solid-state hard drives, PATA-type hard disks, USB "flash" drives, SD non-volatile memory cards, and/or any other suitable component for providing non-volatile computer-readable media. As illustrated, the local storage 118 may include a "native available" portion that is accessible by the native applications 108 but is inaccessible to the container application 112. As further illustrated, the local storage 118 may include a "container available" portion that is accessible by the container application 112 but is inaccessible to the native application 108. In some instances, the local storage 118 may further include a "commonly available" portion that is accessible by both of the native applications 108 and the container application 112.

The local storage 118 may include a machine ID 120 that uniquely identifies the computing device 106. In some implementations, the machine ID 120 may be stored in the "commonly available" portion of the local storage 118. Additionally, or alternatively, the machine ID may be stored in one or both of the "natively available" portion and/or the "container available" portion of the local storage 118.

With respect to the data flow scenario of FIG. 1, upon a user instructing the OS 116 to launch the container application 112, a first activation inquiry 122(1) may be generated and transmitted from the container 110 to an application license manager 102. As illustrated, the container 110 and the container application 112 therein reside in a local data layer in the sense that the container 110 is locally executed at the computing device 106. As further illustrated, the application license manager 102 resides in a cloud data layer in the sense that the application license manager 102 is implemented as a web service and is executed externally from the computing device 106.

In some implementations, prior to sending the first activation inquiry 122, the container application 112 is configured to check the local storage 118 to determine whether a container license 132 has been stored locally in order to activate the container application 112 on the computing device 106. Then, if the container license 132 is available on the local storage 118, the container application 112 may recognize that it has been activated on the computing device 106 and operate in a standard "activated" mode (e.g., by enabling a user to utilize various functionalities of the container application). However, if the container license 132 is not available on the local storage 118, then the container application 112 may recognize that it is not currently activated on the computing device 106.

It can be appreciated that according to conventional application activation techniques, upon a user instructing an OS to launch an application that is not currently activated on a computing device 106 due to a license not being available to the application, that application would typically launch an activation prompt user interface (UI) to inform the user that the application has not been activated and/or to prompt the user to activate the application. According to implementations of the techniques disclosed herein, such an application will instead transmit an activation inquiry 122 to the application license manager 102 to inquire as to whether the application has been designated for automatic activation (e.g., activation without exposure of an activation prompt).

In the illustrated implementation, upon determining that there is no container license 132 available on the local storage 118, the container application 112 responds by transmitting the first activation inquiry 122(1) to the application license manager 102. The first activation inquiry 122(1) includes the machine ID 120 to enable the activation license manager 102 to determine whether the container application 112 has been designated to be provided with a license at the computing device 106. For example, the application license manager 102 may examine license data 104 and determine that the container application 104 has been designated to receive a license. It is worth noting that the specific details of the license data 104 shown in FIG. 1 do not reflect the container application 112 not being designated to receive a license; rather, the specific details shown reflect the license data 104 as updated based on the activation request 126 discussed below. Therefore, in response to the first activation inquiry 122(1), the application license manager 102 transmits license status data 124 to the container application 112 which indicates that a license is not currently available for the container application 112.

The container application 112 may then transmit to the application license manager 102 an activation request 126 that includes the machine ID 120 and/or an activation scope 128 that indicates various details of what type of activation is being requested. Based on the activation request 126, the application license manager 102 may be caused to update the license data 104. For example, in the illustrated scenario, the activation request 126 causes the application license manager 102 to update the license data 104 in association with the machine ID 120 to specifically indicate that the license status for the machine ID is "Activated" in accordance with a license type of "Enterprise Class 1" and a license term that "Expires 1/1/2020." As further illustrated, the license data 104 has been updated to indicate that the activation scope 128 includes the first native application 108(1), the second native application 108(2), and the container application 112 but excludes the N$^{th}$ native application 108(N).

In response to the activation request 126, the application license manager 102 provides product activation data 130 to the container application 112. As indicated by the lock symbol of the container application being toggled from "locked" to "unlocked," the product activation data 130 is usable to activate the container application 112 on the computing device 106. For example, the product activation data 130 may include a container license 132 that is stored by the container application 112 within the container available portion of the local storage 118. The container available portion of the local storage 118 may be a virtual registry and/or virtual storage that is accessible only by the container application 112 but not the native applications 108. Accordingly, upon a user closing down and then re-launching the container application 112, the container license 132 can be re-obtained by the container application 112 to determine whether it is appropriate to unlock various functionalities of the container application 112.

As described above, the OS 116 may impose strict limitations on an ability of the native application 108 to communicate with the container application 112, and vice versa. Accordingly, the native application(s) 108 may be unable to obtain the container license 132 locally or otherwise locally communicate with the container application 112 to determine that an activation has occurred which is applicable to the native application(s) 108. Thus, in the illustrated scenario, a second activation inquiry 122(2) may be transmitted to the application license manager 102 for determining whether the second native application 108(2) (and/or other native applications 108 for that matter) have been designated within the license data 104 for automatic activation. For example, responsive to a user instructing the OS 116 to launch the second native application 108(2), the second native application 108(2) may examine the local storage 118 and determine that a native license 136 is not locally available. Based on this determination, the second native application 108(2) may transmit the second activation inquiry 122(2) to the application license manager 102. Similar to the first activation inquiry 122(1), the second activation inquiry 122(2) also includes the machine ID 120 to enable the application license manager 102 to identify which particular computing device the second activation inquiry 122(2) corresponds to.

Upon receipt of the second activation inquiry 122(2), the application license manager 102 examines the license data 104 to determine whether the second native application 108(2) has been designated for automatic activation at the computing device 106. As illustrated, following receipt of the activation request 126, the application license manager 102 has updated the license data 104 to indicate that a license has been activated with respect to the computing device 106 as identified by the machine ID 120. The "updated" license data 104 further indicates that the license is applicable to second native application 108(2). Therefore, the application license manager 102 responds to the second activation inquiry 122(2) with counterpart product activation data 134.

As indicated by the lock symbol of the first native application 108(1) and the second native application 108(2) being toggled from "locked" to "unlocked," the counterpart product activation data 134 is usable to activate these two native applications 108 on the computing device 106. For example, the counterpart product activation data 134 may include a native license 136 which may be stored by the second native application 108(2) within the native available portion of the local storage 118. In some implementations, the native license 136 is a duplicate instance of the container license 132. Stated plainly, the native license 136 may be identical or substantially identical to the container license 132. The native available portion of the local storage 118 may correspond to Registry Keys and/or other configuration databases that are suitable for storing encrypted and/or unencrypted product licenses.

Once the counterpart product activation data 134 is obtained by the second native application 108(2), any native application(s) 108 for which the counterpart product activation data 134 is applicable may be activated on the computing device 106 without any subsequent activation prompt being shown to the user in association with these native application(s) 108. In this way, one or more processing units of the computing device 106 may be spared from having to perform redundant processing cycles which would otherwise be required to re-collect user credentials, and/or any other data collected in association with the activation prompt presented by the container application 112.

Figure 2:
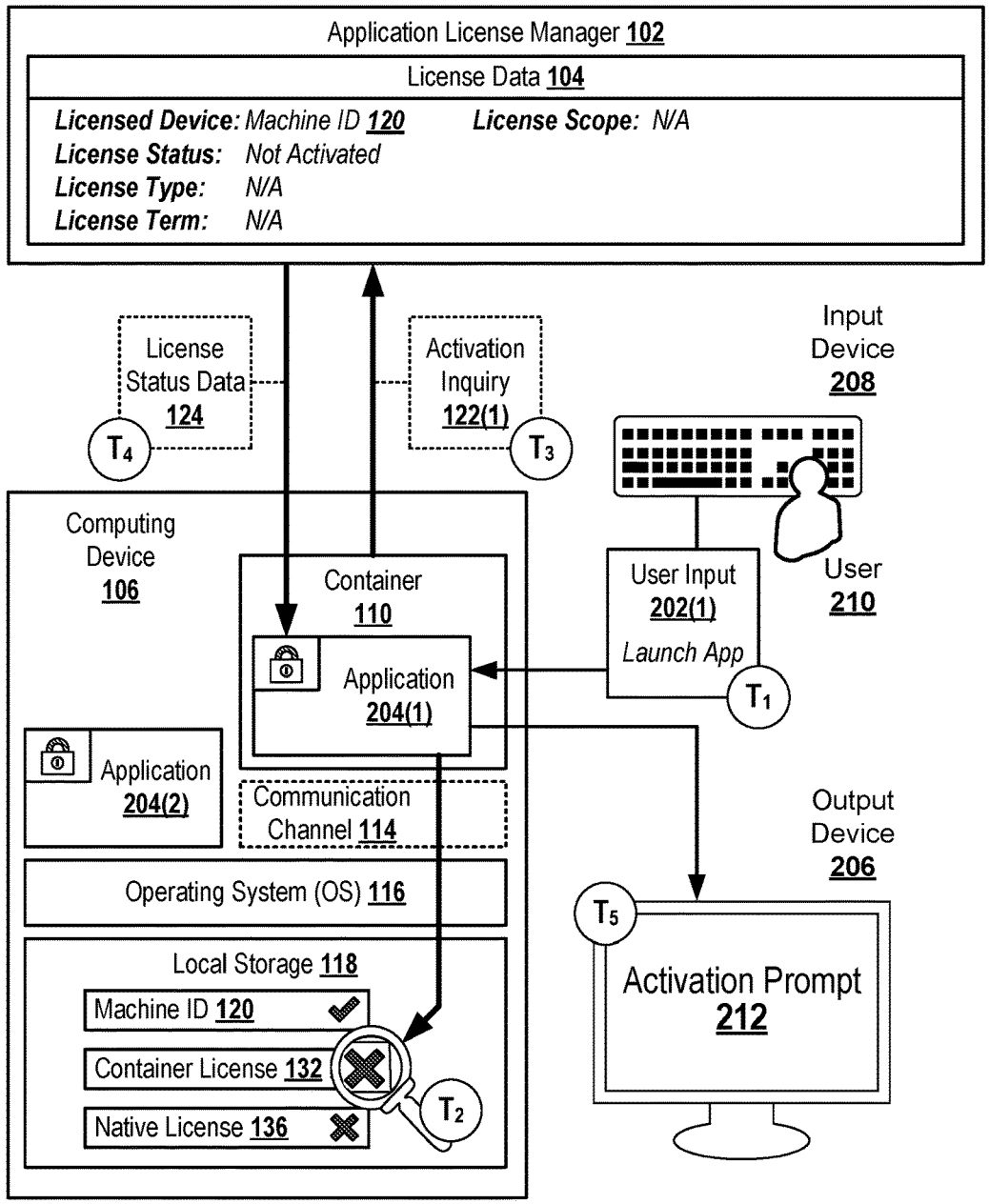
FIG. 2 illustrates an exemplary system in which a user instructs the OS to launch a first application which then responds by checking for a license both at the local storage and with the application license manager prior to exposing an activation prompt.
Figure 3:
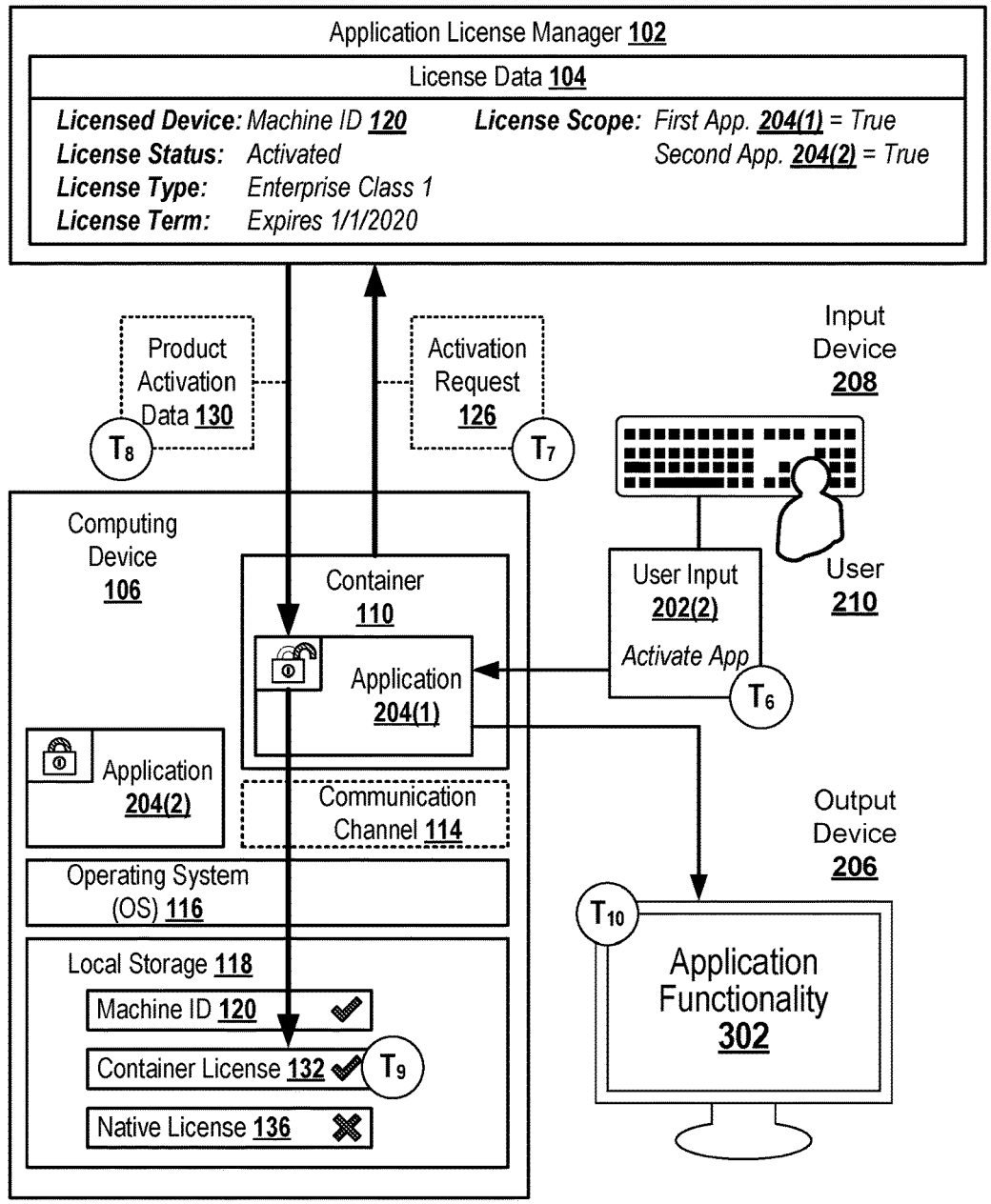
FIG. 3 illustrates an exemplary system in which a user activates the first application which causes the application license manager to provide a license to the first application and also to update the license data to designate a second application for automatic activation at the computing device.
Figure 4:
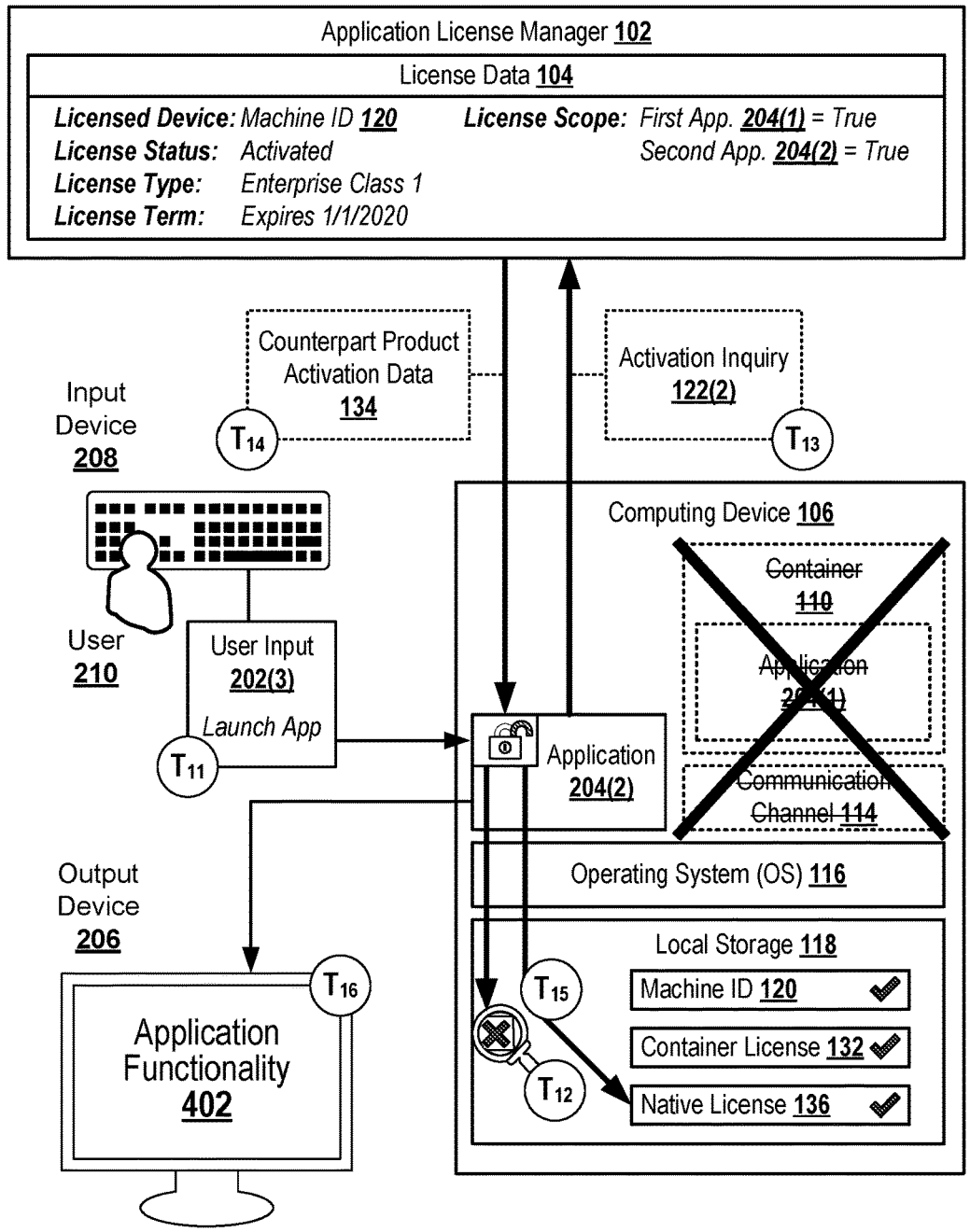
FIG. 4 illustrates an exemplary system in which a user instructs the OS to launch the second application after the license data has been updated as described in FIG. 3 which results in the second application being automatically activated at the computing device.

To illustrate aspects of the techniques disclosed herein, FIGS. 2-4 illustrate exemplary data flow scenarios in which various operations and/or functionalities occur in a specific order. For example, FIG. 2 describes various operations and/or functionalities occurring at five sequential times that are individually labeled $T_1$ through $T_5$. However, the order in which these operations and/or functionalities are described and/or illustrated herein is not intended to be construed as a limitation. Rather, any number of the operations and/or functionalities described with respect to FIGS. 2-4 may be combined in any order and/or in parallel in accordance with the present disclosure. Other processes and/or operations and/or functionalities described throughout this disclosure shall be interpreted accordingly.

Turning now to FIG. 2, illustrated is an exemplary system 200 in which a user 210 instructs the OS 116 to launch a first application 204(1) which then responds by checking for a license both at the local storage 118 and with the application license manager 102 prior to exposing an activation prompt 212.

At time $T_1$, the user 210 provides first user input 202(1) to the computing device 106 via an input device 208. As illustrated, the first user input 202(1) is a "Launch App" instruction that corresponds to the first application 204(1). Upon receipt of the first user input 202(1), the OS 116 may begin to execute the first application 204(1). In some implementations, the OS 116 further initializes the container 110 and/or the communication channel 114 to isolate the first application 204(1) from a second application 204(2).

At time $T_2$, the first application 204(1) analyzes the local storage 118 to check for a corresponding license. As shown, the first application 204(1) is shown to be checking for the container license 132 which is currently not present at the local storage 118. It can be appreciated that the presence or absence of a corresponding license may inform the first application 204(1) as to various operations to subsequently perform. For example, if a corresponding license is present in the local storage 118, this may inform the first application 204(1) to make certain functionalities available to the user 210. Moreover, according to conventional application activation techniques, if a corresponding license is not present, this may inform the first application 204(1) to perform alternative operations such as, for example, exposing the activation prompt 212.

In contrast to the aforementioned conventional application activation techniques, at time $T_3$, the first application 204(1) may respond to a corresponding license being absent from the local drive 118 by transmitting the first activation inquiry 122(1) to the application license manager 102. As shown in the license data 104 of FIG. 2, the License Status associated with the computing device 106 at the time when the first activation inquiry 122(1) is transmitted is "Not Activated."

At time $T_4$, therefore, the application license manager 102 responds to the first activation inquiry 122(1) with license status data 124 to inform the first application 204(1) that no license is currently available for the first application 204(1) at the computing device 106 (as identified by the machine ID 120).

At time $T_5$, the first application 204(1) responds to receiving the license status data 124 by causing an output device 206 to expose an activation prompt 212. As indicated by the lock symbol of the container application remaining "locked," the first application 204(1) remains locked throughout the exemplary data flow scenario of FIG. 2.

Turning now to FIG. 3, illustrated is an exemplary system 300 in which a user 210 activates the first application 204(1) which causes the application license manager 102 to provide a license to the first application 204(1) and also to update the license data 104 to designate a second application 204(2) for automatic activation at the computing device 106. For illustrative purposes, FIG. 3 is discussed with respect to an exemplary data flow scenario that begins at time $T_6$ which is subsequent to $T_5$ as discussed in relation to FIG. 2.

At time $T_6$, the user 210 provides second user input 202(2) to the computing device 106 via the input device 208. As illustrated, the second user input 202(2) is an "Activate App" instruction that corresponds to the first application 204(1). The "Activate App" instruction may include any information that is relevant to activation of the first application 204(1) and/or the second application 204(2). For purposes of the present discussion, assume that the "Activate App" instruction includes the machine ID 120 and indicates a type of license being requested and a term of the license being requested. In various implementations, the license type may indicate which applications on the computing device 106 the "Activate App" instruction is requesting activation for.

At time $T_7$, the first application 204(1) transmits an activation request 126 to the application license manager 102 to request a corresponding license to unlock certain functionalities of the first application 204(1) on the computing device 106. Responsive to the activation request 126, the application license manager 102 updates license data 104 to designate the second application 204(2) for automatic activation at the computing device 106. For example, the "updated" license data 104 indicates that a license that is issued to the first application 204(1) based on the activation request 126 is equally applicable to the second application 204(2).

At time $T_8$, the application license manager 102 responds to the activation request 126 with product activation data 130. As indicated by the lock symbol of the first application 204(1) being toggled from "locked" to "unlocked," the product activation data 130 is usable to activate the first application 204(1) on the computing device 106. For example, the product activation data 130 may include the container license 132.

At time $T_9$, the first application 204(1) saves at least some of the product activation data 130 into the local storage 118 for subsequent use in unlocking one or more application functionalities 302.

At time $T_{10}$, the first application 204(1) may expose the one or more application functionalities 302 to the user 210 via the output device 206.

Turning now to FIG. 4, illustrated is an exemplary system 400 in which a user 210 instructs the OS 116 to launch the second application 204(2) after the license data 104 has been updated as described in FIG. 3 to designate the second application 204(2) for automatic activation at the computing device 106. For illustrative purposes, FIG. 4 is discussed with respect to an exemplary data flow scenario that begins at time $T_{11}$ which is subsequent to $T_{10}$ as discussed in relation to FIG. 3. Furthermore, as indicated by the strike-through text and the "X" symbol over the container 110 and the communication channel 114, the operations described in FIG. 4 may occur after the first application 204(1) and/or a container 110 corresponding thereto have been terminated.

At time $T_{11}$, the user 210 provides third user input 202(3) to the computing device 106 via an input device 208. As illustrated, the third user input 202(3) is a "Launch App" instruction that corresponds to the second application 204(2). Upon receipt of the third user input 202(3), the OS 116 may begin to execute the second application 204(2).

At time $T_{12}$, the second application 204(2) analyzes the local storage 118 to check for a corresponding license. It can be appreciated that the presence or absence of a corresponding license may inform the second application 204(2) as to various operations to subsequently perform. For example, if a corresponding license is present in the local storage 118, the second application 204(2) may unlock certain functionalities for use by the user 210. As illustrated, however, a corresponding license is not present at time $T_{12}$. For example, although a license does exist on the local storage 118, that license is not obtainable by the second application 204(2) for one or more reasons. For example, by virtue of one or both of the first application 204(1) or the second application 204(2) being designated to be run within a container 110, the container license 132 may be stored in association with a particular namespace and/or partition that is inaccessible to the second application 204(2).

At time $T_{13}$, therefore, the second application 204(2) responds to a corresponding license being absent from the local drive 118 by transmitting a second activation inquiry 122(2) to the application license manager 102. As shown in the license data 104 of FIG. 4, the License Status associated with the computing device 106 at the time when the second activation inquiry 122(2) is transmitted is "Activated." Furthermore, the license scope of this activation includes the second application 204(2).

At time $T_{14}$, therefore, the application license manager 102 responds to the second activation inquiry 122(2) with counterpart product activation data 134 to automatically activate the second application 204(2) on the computing device 106 without the user 210 being exposed to any subsequent activation prompt as was previously exposed at time $T_5$ in FIG. 2.

At time $T_{15}$, the second application 204(2) saves at least some of the counterpart product activation data 134 to the local storage 118. For example, as illustrated, the second application 204(2) is shown to store the native license 136 as obtained within and/or constructed from the counterpart product activation data 134.

At time $T_{16}$, the second application 204(2) exposes the one or more application functionalities 402 to the user 210 via the output device 206. In this way, despite the second application 204(2) being launched by the user 210 prior to being activated on the computing device 106, and the computing device 106 being configured such that the first application 204(1) cannot share its license with the second application 204(2), the second application 204(2) refrains from re-prompting the user 210 to activate the second application 204(2) as would occur according to existing application activation systems.

Accordingly, the disclosed technologies represent a substantial advantage over existing application activation systems which can jointly activate counterpart applications only under circumstances where the counterpart applications can directly communicate with one another. For example, despite the second application 204(2) being provided with the container license 132, it may be limited in terms of where it is permitted to store this container license 132 (e.g., since it is designed to be containerized). Thus, it may be unable store the container license 132 in a location that is accessible to the first application 204(1) such as, for example, in Registry Keys of the OS 116. Accordingly, the techniques described herein provide for a secure and efficient manner of jointly activating isolated counterpart applications and avoiding obnoxious and computationally burdensome redundant activation prompts.

It can be appreciated that redundant computing processes (e.g., exposing redundant activation prompts) result in exorbitant consumption of computing resources. For example, by causing a user to progress through redundant activation sequences for counterpart products, the processing units of a computing device are caused to undergo unnecessarily high numbers of processing cycles. Additionally, due to the user having to re-enter much of the same information (e.g., credentials, user names, passwords, etc.) in a redundant activation prompt as was previously entered in an initial activation prompt, it can further be appreciated that redundant activation prompts also unnecessarily increase networking traffic.

Figure 5:
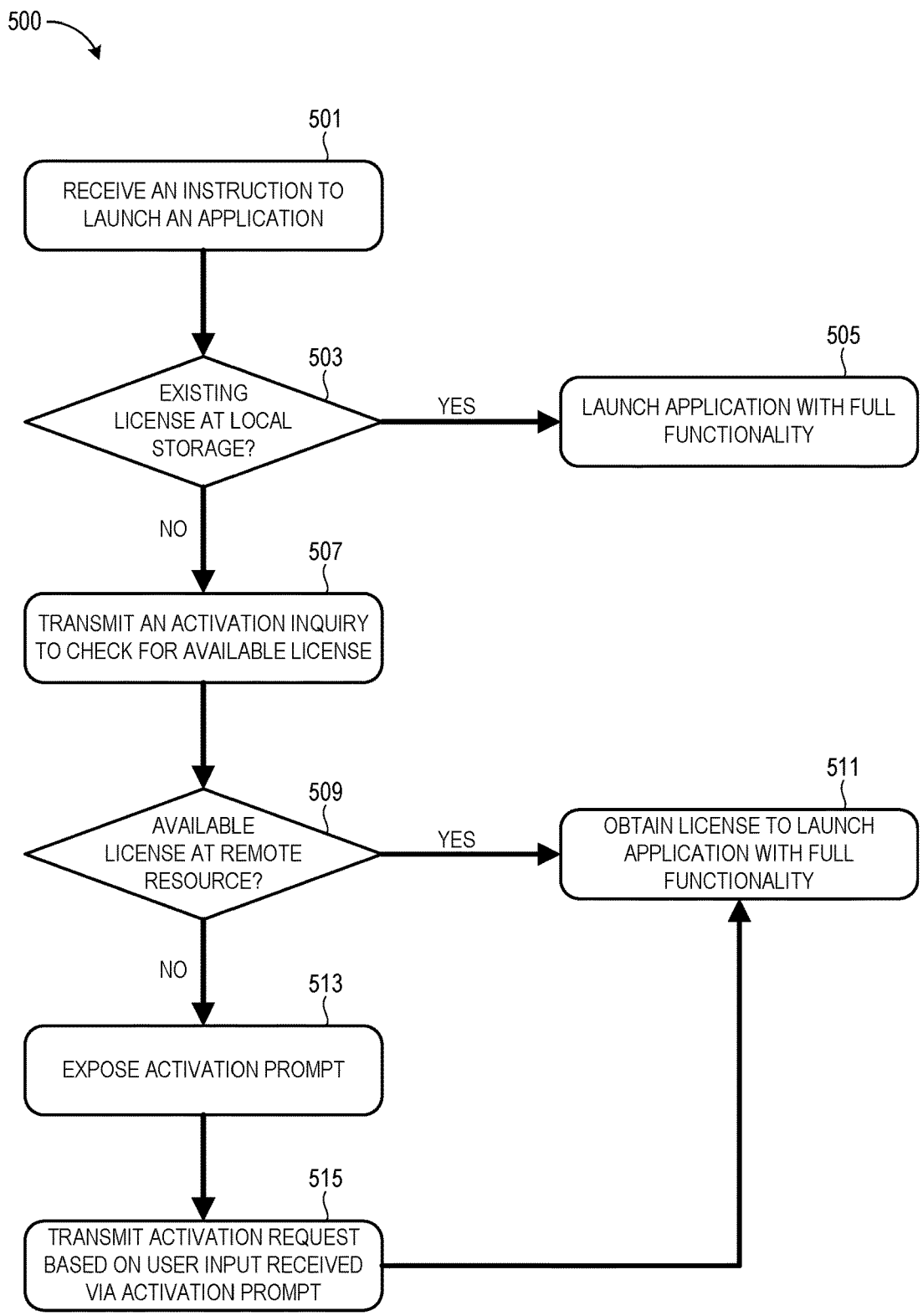
FIG. 5 is a flow diagram of an example method for an application to perform upon being launched to check both locally for an existing license and remotely for an available license prior to exposing an activation prompt to a user.

FIG. 5 is a flow diagram of an example method 500 for an application to perform upon being launched to check both locally for an existing license and remotely for an available license prior to exposing an activation prompt to a user. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

At block 501, the OS 116 of the computing device 106 may receive an instruction to launch an application such as, for example, the container application 112 or a native application 108. For example, first user input 202(1) may be received via an input device 208 such as a user double-clicking an icon for the application.

At block 503, the application checks a local storage 118 for an existing license to determine whether the application has been activated on the computing device 106. For example, the application may examine Registry Key values, a virtual registry, and/or any other suitable location for securely storing a license in association with the application.

If an existing license exists on the local storage 118, the process 500 may advance from block 503 to block 505 at which the application is launched with full functionality being provisioned to the user. Thus, similar to existing application licensing techniques, according to the techniques described herein, when a license exists locally for an application a user may launch that application to access functionality without being prompted to activate the application.

If an existing license is not available to the application from the local storage 118, the process 500 may advance from block 503 to block 507 at which an activation inquiry is transmitted to a remote resource to check whether a license is available to the application due to having been remotely designated for automatic activation at the computing device. For example, the activation inquiry 122 may be transmitted to the application license manager 102 which maintains license data 104 in the cloud (e.g., one or more remote and/or distributed servers) for multiple applications of the computing device 106.

At block 509, the application determines whether a license is available from the remote resource. For example, the application may receive license status data 124 indicating that the application has not been designated for automatic activation and, therefore, that an available license cannot be obtained from the remote resource. In contrast, the application may receive counterpart product activation data which includes a license for activating the application on the computing device.

If a license is available from the remote resource, the process 500 may advance from block 509 to block 511 at which the available license is obtained by, for example, extracting the license from the counterpart product activation data. Then, the application is launched with full functionality being provisioned to the user without the user being prompted to activate the application at the computing device. Thus, in contrast to existing application licensing techniques, according to the techniques described herein, when a license does not exist locally for an application but is available from a remote resource, a user may launch that application to access functionality without being prompted to activate the application. More specifically, existing application licensing techniques, would typically prompt the user to activate the product when no license exists locally without regard to whether a license may be available from a remote resource.

If a license is not available from the remote resource, the process 500 may advance from block 509 to block 513 at which the user is prompted to activate the application on the computing device. For example, the application may expose the activation prompt 212 to inform the user that the product is not activated and to provide one or more activation options to the user.

At block 515, the application may transmit an activation request to the remote resource based on user input that is received via the activation prompt exposed at block 513. Then, upon receiving product activation data in response to the activation request, the process 500 may advance to block 511 as described above.

Figure 6:
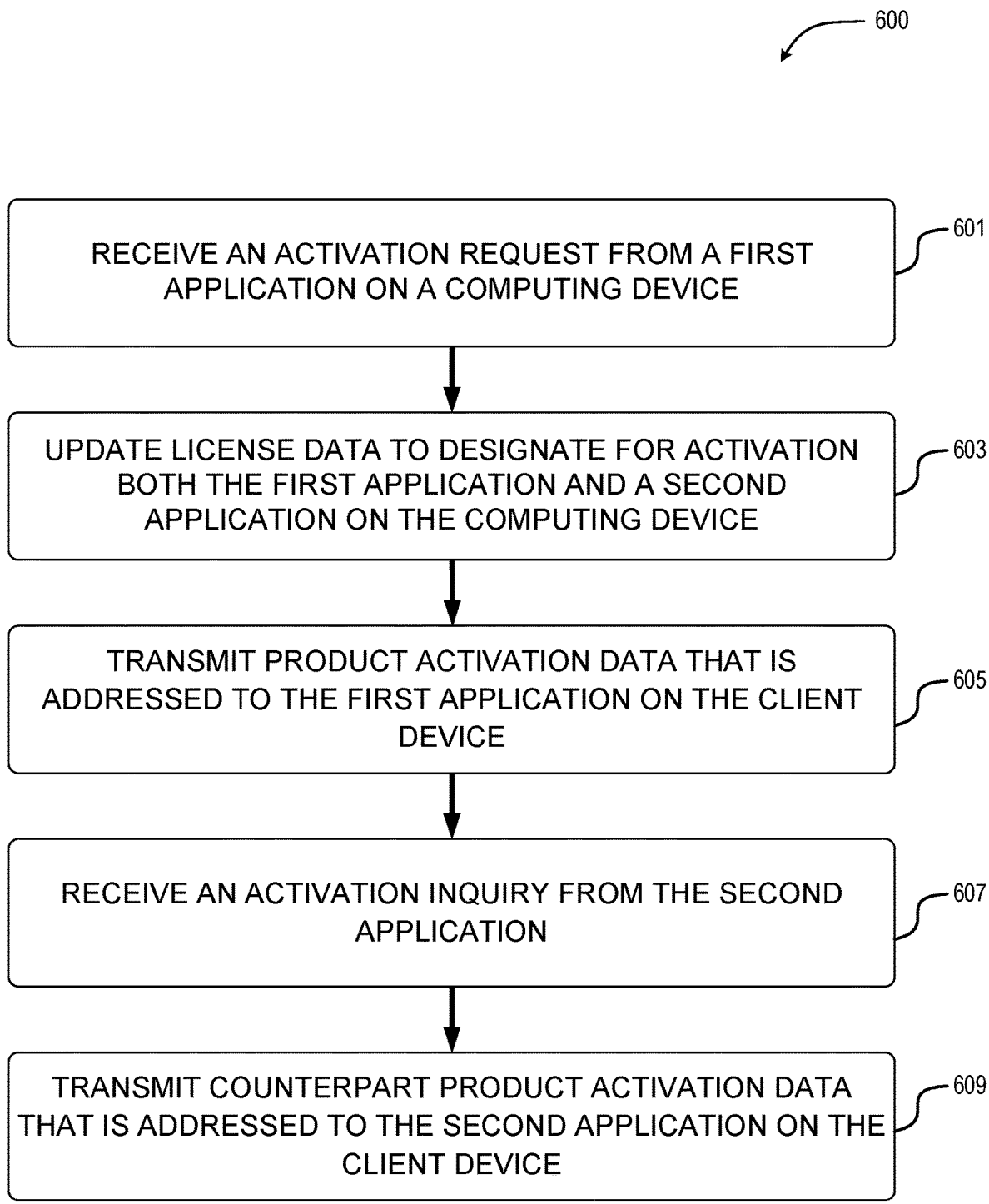
FIG. 6 is a flow diagram of an example method for an application license manager to perform to activate multiple applications on a computing device based on an activation request received from an individual one of the multiple applications.

FIG. 6 is a flow diagram of an example method 600 for an application license manager to perform to activate multiple applications on a computing device based on an activation request received from an individual one of the multiple applications.

At block 601, the application license manager 102 receives an activation request from a first application 204(1) that is installed on a computing device 106. For example, a user may launch the first application 204(1) which then determines that no license exists locally and furthermore that no license is available from the application license manager. Accordingly, the user may be prompted to activate the first application 204(1) at the computing device.

At block 603, the application license manager 102 updates license data 104 to designate both the first application 204(1) and a second application 204(2) on the client device 106 for activation. For example, the activation request may define an activation scope to include both applications.

At block 605, the application license manager 102 may respond to the activation request by transmitting to the client device product activation data that is addressed to the first application. The product activation data may include a license to activate the first application 204(1).

At block 607, the application license manager 102 receives an activation inquiry from the second application 204(2) that is installed on the computing device 106. For example, a user may launch the second application 204(2), which then determines that no license exists locally; then, rather than immediately exposing an activation prompt to the user, transmits the activation inquiry to inquire as to whether any counterpart products have performed an activation that is applicable to the second application 204(2).

At block 609, the application license manager 102 may respond to the activation inquiry by transmitting to the client device counterpart product activation data that is addressed to the second application. The counterpart product activation data may include a license to activate the second application 204(2). In this way, if a user has already activated a counterpart application which is also installed on the computing device, but which is restricted from locally sharing a license, the user will not be prompted to perform another activation which is redundant to that performed with respect to the counterpart product.

Figure 7:
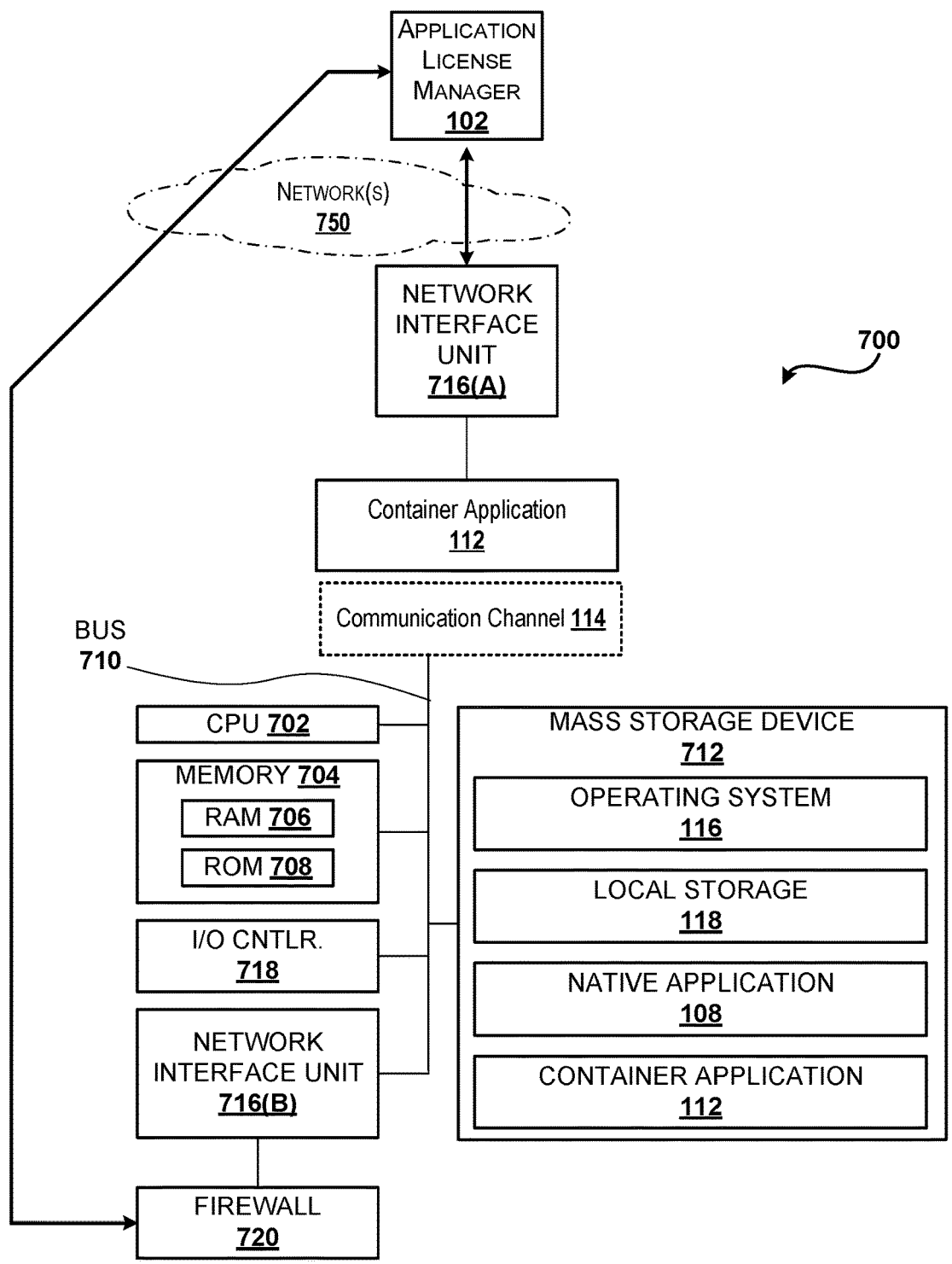
FIG. 7 shows additional details of an example computer architecture for a computer capable of executing the systems and methods described herein.

FIG. 7 shows additional details of an example computer architecture 700 for a computer capable of executing the systems and methods described herein. In particular, the example computing architecture 700 is capable of executing functions described in relation to the OS 116, the container application 112, the native application 108, the application license manager 102, and/or any other program components thereof as described herein. Thus, the computer architecture 700 illustrated in FIG. 7 illustrates an architecture for a server computer, network of server computers, or any other types of computing devices suitable for implementing the functionality described herein. The computer architecture 700 may be utilized to execute any aspects of the software components presented herein.

The computer architecture 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing the host OS that supports the containers 110, other data, and one or more application programs. The mass storage device 712 may further include one or more of the OS 116, the local storage 118, the native application(s) 108, and/or the container application 112.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various techniques, the computer architecture 700 may operate in a networked environment using logical connections to remote computers through a network 750 and/or another network (not shown). The computer architecture 700 may connect to the network 750 through one or more network interface units 716 connected to the bus 710 and/or the container application 112. In the illustrated embodiment, container application 112 is connected to a first network interface unit 716(A) that provides container application 112 with access to the application license manager 102. The computer architecture 700 further includes a communications channel 114 that isolates container application 112 from various components of the computer architecture 700 such as, for example, the OS 116 and/or certain native available portions of the local storage 118.

The illustrated computer architecture 700 further includes a second network interface unit 716(B) that connects various native applications 108 to the one or more networks 750 via a firewall 720. As illustrated, the networks 750 and firewall 720 enable communications to be passed through to the application license manager 102. The firewall 720 is configured to provide the computer architecture 700 with an inability to perform at least some outward communications while blocking unauthorized access from the networks 750. It should be appreciated that the network interface unit(s) 716 also may be utilized to connect to other types of networks and remote computer systems. The computer architecture 700 also may include an input/output controller 718 for receiving and processing input from a number of other devices, including a keyboard, mouse, or electronic stylus (not shown in FIG. 7). Similarly, the input/output controller 718 may provide output to a display screen, a printer, or other type of output device (also not shown in FIG. 7). It should also be appreciated that via a connection to the network 750 through a network interface unit 716, the computing architecture may enable communication between the functional components described herein.

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

EXAMPLE CLAUSES

The disclosure presented herein may be considered in view of the following clauses.

Example Clause A, a computing device, comprising: one or more processors; a memory in communication with the one or more processors, the memory having computer-readable instructions stored thereupon which, when executed by the one or more processors, cause the computing device to: cause an operating system (OS) to initiate a container application within a container that at least partially restricts communications between the container application and a native application; transmit, from the container application, an activation request that includes at least a machine identification (ID) to cause an application license manager to update license data for the native application in association with the machine ID; subsequent to transmitting the activation request from the container application, transmit an activation inquiry from the native application to the application license manager, wherein the activation inquiry includes at least the machine ID to query whether the native application is licensed with respect to the machine ID; receive, from the application license manager, in response to the activation inquiry, counterpart product activation data that includes a native license corresponding to the native application; and store the native license in association with the native application to activate the native application on the computing device.

Example Clause B, the computing device of Example Clause A, wherein activating the native application on the computing device includes storing the native license, that is received from the application license manager, in a native available portion of a local storage that is available to the native application and is unavailable to the container application.

Example Clause C, the computing device of Example Clause B, wherein the computer-readable instructions further cause the computing device to: receive, from the application license manager, product activation data that includes a container license corresponding to the container application; and store the container license in a container available portion of the local storage that is available to the container application and is unavailable to the native application.

Example Clause D, the computing device of any one of Example Clauses A through C, wherein the computer-readable instructions further cause the computing device to: determine whether the native license is stored on a local storage in association with the native application, wherein the activation inquiry is transmitted to the application license manager in response to a determination that the native license is not stored on the local storage in association with the native application.

Example Clause E, the computing device of any one of Example Clauses A through D, wherein the computer-readable instructions further cause the computing device to: prior to transmitting the activation request, transmit a second activation inquiry to the application license manager, wherein the second activation inquiry includes at least the machine ID to query whether the container application is licensed with respect to the machine ID; and cause an output device to expose an activation prompt in response to a determination that the container application is not licensed with respect to the machine ID.

Example Clause F, the computing device of any one of Example Clauses A through E, wherein the activation request that causes the application license manager to update the license data for the native application is generated based on user input that is received via the container application that the OS is running within the container that at least partially restricts communications with the native application.

Example Clause G, the computing device of any one of Example Clauses A through F, wherein the native license is a substantially duplicative instance of a container license that is usable for activation of the container application on the computing device.

Example Clause H, the computing device of any one of Example Clauses A through G, wherein the activation request that is transmitted by the container application indicates a license term that is applicable to the native application.

Example Clause I, the computing device of any one of Example Clauses A through H, wherein the activation request that is transmitted from the container application indicates an activation scope that defines a subset of a plurality of native applications for activation on the computing device.

Example Clause J, a computing device, comprising: one or more processors; and a memory in communication with the one or more processors, the memory having computer-readable instructions stored thereupon that, when executed by the one or more processors, implement a first application and a second application that is at least partially restricted from communicating with the first application: the first application configured to: cause an output device to expose an activation prompt based at least in part on a first user input, transmit an activation request that is generated based at least in part on a second user input, the activation request to cause an application license manager to update license data in association with at least the second application; and the second application configured to: transmit an activation inquiry to the application license manager based at least in part on a third user input that is received subsequent to the first user input and the second user input, receive, from the application license manager, counterpart product activation data indicating that the second application has been designated for activation within the license data, and provisioning access to one or more functionalities in response to receiving the counterpart product activation data.

Example Clause K, the computing device of Example Clause J, wherein the first application is further configured to: determine, in response to the first user input, whether a corresponding license is stored in a local storage; transmit a second activation inquiry to the application license manager based on a determination that a corresponding license is absent from the local storage; and receive license status data from the application license manager in response to the second activation inquiry, wherein exposing the activation prompt is further based on the license status data.

Example Clause L, the computing device of any one of Example Clauses J through K, wherein the second application is further configured to determine, in response to the third user input, whether a corresponding license is stored in a local storage, wherein transmitting the activation inquiry to the application license manager is further based at least in part on a determination that a corresponding license is absent from the local storage.

Example Clause M, the computing device of any one of Example Clauses J through L, wherein the counterpart product activation data includes a license that is usable to activate the second application, and wherein the second application is further configured to store the license in a portion of a local storage that is inaccessible to the first application.

Example Clause N, the computing device of any one of Example Clauses J through M, wherein the first application is a container application that is configured to be executed within a container, and wherein the second application is a native application that is a counterpart to the container application.

Example Clause O, the computing device of any one of Example Clauses J through N, wherein the activation request includes a machine identifier (ID) and an activation scope, and wherein the activation inquiry includes the machine ID.

Example Clause P, a computer-implemented method, comprising: receiving, from a first application on a computing device, an activation request that includes at least a machine identification (ID) and an activation scope that is inclusive of at least the first application and a second application on the computing device, wherein the computing device is configured to restrict the first application from communicating with the second application; and based at least in part on the activation request being received from the first application: updating license data to designate both the first application and the second application for activation on the computing device; transmitting, to the computing device, product activation data that is addressed to the first application and that includes first license data that is usable to activate the first application on the computing device; and transmitting, to the computing device, counterpart product activation data that is addressed to the second application and that includes second license data that is usable to activate the second application on the computing device.

Example Clause Q, the computer-implemented method of Example Clause P, wherein transmitting the product activation data is responsive to the activation request that is received from the first application, and wherein the counterpart product activation data is responsive to an activation inquiry that is received from the second application.

Example Clause R, the computer-implemented method of any one of Example Clauses P through Q, wherein the second license data that is usable to activate the second application is further usable to activate one or more other applications on the computing device.

Example Clause S, the computer-implemented method of any one of Example Clauses P through R, wherein the first application is a container application that is included within an application suite, and wherein the second application is a native application that is included within the application suite.

Example Clause T, the computer-implemented method of any one of Example Clauses P through S, wherein the second license data is an at least partially duplicative instance of the first license data.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:
1. A computing device, comprising:
one or more processors;
a memory in communication with the one or more processors, the memory having computer-readable instruc- tions stored thereupon which, when executed by the one or more processors, cause the computing device to:
based on a first user input, cause an operating system (OS) to initiate a container application within a container that restricts local communications between the container application and a native application, wherein initiation of the container application causes an output device to expose an activation prompt in association with the container application;
based on a second user input, transmit, from the container application, an activation request that includes at least a machine identification (ID) to cause an application license manager to update license data for the native application in association with the machine ID;
based on a third user input that is received subsequent to transmitting the activation request from the container application, transmit an activation inquiry from the native application to the application license manager, wherein the activation inquiry includes at least the machine ID to query whether the native application is licensed with respect to the machine ID;
receive, from the application license manager, in response to the activation inquiry, counterpart product activation data that includes a native license corresponding to the native application; and
store the native license in association with the native application to activate the native application on the computing device.

2. The computing device of claim 1, wherein activating the native application on the computing device includes storing the native license, that is received from the application license manager, in a native available portion of a local storage that is available to the native application and is unavailable to the container application.

3. The computing device of claim 2, wherein the computer-readable instructions further cause the computing device to:
receive, from the application license manager, product activation data that includes a container license corresponding to the container application; and
store the container license in a container available portion of the local storage that is available to the container application and is unavailable to the native application.

4. The computing device of claim 1, wherein the computer-readable instructions further cause the computing device to:
determine whether the native license is stored on a local storage in association with the native application, wherein the activation inquiry is transmitted to the application license manager in response to a determination that the native license is not stored on the local storage in association with the native application.

5. The computing device of claim 1, wherein the computer-readable instructions further cause the computing device to:
prior to transmitting the activation request, transmit a second activation inquiry to the application license manager, wherein the second activation inquiry includes at least the machine ID to query whether the container application is licensed with respect to the machine ID; and
cause an output device to expose an activation prompt in response to a determination that the container application is not licensed with respect to the machine ID.

6. The computing device of claim 1, wherein the activation request that causes the application license manager to update the license data for the native application is generated based on user input that is received via the container application that the OS is running within the container that at least partially restricts communications with the native application.

7. The computing device of claim 1, wherein the native license is a counterpart instance of a container license that is usable for activation of the container application on the computing device.

8. The computing device of claim 1, wherein the activation request that is transmitted by the container application indicates a license term that is applicable to the native application.

9. The computing device of claim 1, wherein the activation request that is transmitted from the container application indicates an activation scope that defines a subset of a plurality of native applications for activation on the computing device.

10. A computing device, comprising:
one or more processors; and
a memory in communication with the one or more processors, the memory having computer-readable instructions stored thereupon that, when executed by the one or more processors, implement a first application and a second application that is restricted from locally communicating with the first application:
the first application configured to:
cause an output device to expose an activation prompt based at least in part on a first user input,
transmit an activation request that is generated based at least in part on a second user input, the activation request to cause an application license manager to update license data in association with at least the second application; and
the second application configured to:
transmit an activation inquiry to the application license manager based at least in part on a third user input that is received subsequent to the first user input and the second user input,
receive, from the application license manager, counterpart product activation data indicating that the second application has been designated for activation within the license data, and
provisioning access to one or more functionalities in response to receiving the counterpart product activation data.

11. The computing device of claim 10, wherein the first application is further configured to:
determine, in response to the first user input, whether a corresponding license is stored in a local storage;
transmit a second activation inquiry to the application license manager based on a determination that a corresponding license is absent from the local storage; and
receive license status data from the application license manager in response to the second activation inquiry, wherein exposing the activation prompt is further based on the license status data.

12. The computing device of claim 10, wherein the second application is further configured to determine, in response to the third user input, whether a corresponding license is stored in a local storage, wherein transmitting the activation inquiry to the application license manager is further based at least in part on a determination that a corresponding license is absent from the local storage.

13. The computing device of claim 10, wherein the counterpart product activation data includes a license that is usable to activate the second application, and wherein the second application is further configured to store the license in a portion of a local storage that is inaccessible to the first application.

14. The computing device of claim 10, wherein the first application is a container application that is configured to be executed within a container, and wherein the second application is a native application that is a counterpart to the container application.

15. The computing device of claim 10, wherein the activation request includes a machine identifier (ID) and an activation scope, and wherein the activation inquiry includes the machine ID.

16. A computer-implemented method, comprising:
receiving, from a first application on a computing device, an activation request that includes at least a machine identification (ID) and an activation scope that is inclusive of at least the first application and a second application on the computing device, wherein the computing device is configured to restrict the first application from locally communicating with the second application, and wherein the first application is initiated on the computing device in response to a first user input and the activation request is transmitted by the computing device in response to a second user input being received in association with the first application; and
based at least in part on the activation request being received from the first application:
updating license data to designate both the first application and the second application for activation on the computing device;
transmitting, to the computing device, product activation data that is addressed to the first application and that includes first license data that is usable to activate the first application on the computing device; and
transmitting, to the computing device, counterpart product activation data that is addressed to the second application and that includes second license data that is usable to activate the second application on the computing device.

17. The computer-implemented method of claim 16, wherein transmitting the product activation data is responsive to the activation request that is received from the first application, and wherein the counterpart product activation data is responsive to an activation inquiry that is received from the second application.

18. The computer-implemented method of claim 16, wherein the second license data that is usable to activate the second application is further usable to activate one or more other applications on the computing device.

19. The computer-implemented method of claim 16, wherein the first application is a container application that is included within an application suite, and wherein the second application is a native application that is included within the application suite.

20. The computer-implemented method of claim 16, wherein the second license data is a counterpart instance of the first license data.

* * * * *